(12) United States Patent
Aleksander et al.

(10) Patent No.: US 11,405,188 B2
(45) Date of Patent: Aug. 2, 2022

(54) METHOD FOR SECURE TRANSFERRING OF INFORMATION THROUGH A NETWORK BETWEEN AN ORIGIN VIRTUAL ASSET SERVICE PROVIDER AND A DESTINATION VIRTUAL ASSET SERVICE PROVIDER

(71) Applicant: COINFIRM LIMITED, London (GB)

(72) Inventors: Pawel Zygmunt Aleksander, Kobylniki (PL); Pawel Kuskowski, Golub-Dobrzyn (PL); Jakub Fijolek, Bydgoszcz (PL)

(73) Assignee: COINFIRM LIMITED, London (GB)

( * ) Notice: Subject to any disclaimer, the term of this patent is extended or adjusted under 35 U.S.C. 154(b) by 79 days.

(21) Appl. No.: 17/039,639

(22) Filed: Sep. 30, 2020

(65) Prior Publication Data

US 2021/0099293 A1   Apr. 1, 2021

(30) Foreign Application Priority Data

Sep. 30, 2019   (EP) ..................................... 19200574

(51) Int. Cl.
*H04L 29/06*    (2006.01)
*H04L 9/08*     (2006.01)
(Continued)

(52) U.S. Cl.
CPC .......... *H04L 9/0825* (2013.01); *H04L 9/0643* (2013.01); *H04L 9/3236* (2013.01);
(Continued)

(58) Field of Classification Search
CPC ... H04L 9/0825; H04L 9/0643; H04L 9/3236; H04L 9/3247; H04L 9/3271; H04L 2209/38; H04L 2209/56; H04L 9/3239
See application file for complete search history.

(56) References Cited

U.S. PATENT DOCUMENTS 10,498,542 B2 *  12/2019  Ebrahimi ........... G06Q 20/3827
10,587,609 B2 *   3/2020  Ebrahimi .............. H04L 63/061
(Continued)

FOREIGN PATENT DOCUMENTS

AU    2015389877 A1 * 10/2017 ........... G06Q 20/065
CA       3008705 C  *  3/2020 ........... G06F 16/137
(Continued)

*Primary Examiner* — Sher A Khan
(74) *Attorney, Agent, or Firm* — Masuvalley and Partners; Peter R. Martinez

(57) ABSTRACT

The invention is related to a method for secure transferring of information through a network between an origin Virtual Asset Service Provider and a destination Virtual Asset Service Provider, in a hostile environment, where every entity (party member, network node) must proof its entitlement of the information being exchanged. Hostile environment means that neither any entity/network node nor the network as a whole can be trusted. The present method doesn't require other party member/network node or database to secure information transfer. Neither it requires any other trusted entity or server to guarantee or provide proof of ownership of exchange information. The present method for communicating securely between electronic devices uses asymmetric key encryption.

The invention comprises also a computer program product comprising program code stored on a non-transitory computer readable medium, said program code comprising computer instructions for performing the inventive method.

15 Claims, 5 Drawing Sheets

(51) Int. Cl.
*H04L 9/06* (2006.01)
*H04L 9/32* (2006.01)
*H04L 9/00* (2022.01)

(52) U.S. Cl.
CPC .......... *H04L 9/3247* (2013.01); *H04L 9/3271* (2013.01); *H04L 9/50* (2022.05); *H04L 2209/56* (2013.01)

(56) References Cited

U.S. PATENT DOCUMENTS

| | | | |
|---|---|---|---|
| 10,594,498 B2* | 3/2020 | Uhr | H04W 12/0431 |
| 10,637,665 B1* | 4/2020 | Sundaresan | G06F 21/32 |
| 10,700,853 B2 | 6/2020 | Kravitz et al. | |
| 10,783,260 B2* | 9/2020 | Uhr | H04L 9/0643 |
| 2011/0258452 A1* | 10/2011 | Coulier | H04L 9/3242 |
| | | | 713/171 |
| 2015/0242634 A1* | 8/2015 | Lietz | G06F 21/577 |
| | | | 726/25 |
| 2016/0314022 A1* | 10/2016 | Pabari | H04L 41/147 |
| 2017/0257358 A1* | 9/2017 | Ebrahimi | H04L 9/40 |
| 2018/0196960 A1* | 7/2018 | Gullicksen | H04W 12/08 |
| 2018/0227131 A1* | 8/2018 | Ebrahimi | H04L 9/3263 |
| 2018/0240107 A1* | 8/2018 | Andrade | G06Q 20/36 |
| 2019/0190724 A1* | 6/2019 | Sundaresan | H04L 9/3271 |
| 2019/0296920 A1* | 9/2019 | Uhr | H04L 63/18 |
| 2020/0204338 A1 | 1/2020 | Bougalis | |
| 2020/0184471 A1* | 6/2020 | Liu | H04L 9/3239 |

FOREIGN PATENT DOCUMENTS

| | | | | |
|---|---|---|---|---|
| WO | WO-2018145127 A1 * | 8/2018 | | G06F 21/31 |
| WO | WO-2019016185 A1 | 1/2019 | | |

* cited by examiner

METHOD FOR SECURE TRANSFERRING OF INFORMATION THROUGH A NETWORK BETWEEN AN ORIGIN VIRTUAL ASSET SERVICE PROVIDER AND A DESTINATION VIRTUAL ASSET SERVICE PROVIDER

RELATED APPLICATIONS

This application claims priority to European Patent Application No. 19200574.2 filed Sep. 30, 2019, entitled Method And System For Data Assets Exchange And Validation Of Data Assets Exchange, which is hereby incorporated herein by reference in its entirety.

TECHNICAL FIELD

The invention generally relates to methods for secure data exchange in a computer network, compliant with Financial Action Task Force (FATF) Travel Rule, in particular, to a method for secure transferring of information through a network between an origin Virtual Asset Service Provider, and a destination Virtual Asset Service Provider. The present invention further relates to a computer readable storage medium comprising computer program code instructions for implementing the method.

BACKGROUND

The Financial Action Task Force (FATF) is an intergovernmental body established in 1989 by the Ministers of its Member jurisdictions. The objectives of the FATF are to set standards and promote effective implementation of legal, regulatory and operational measures for combating money laundering, terrorist financing and other related threats to the integrity of the international financial system. The FATF is therefore a "policy-making body" which works to generate the necessary political will to bring about national legislative and regulatory reforms in these areas.

The FATF has developed a series of Recommendations that are recognized as the international standard for combating of money laundering and the financing of terrorism and proliferation of weapons of mass destruction. They form the basis for a coordinated response to these threats to the integrity of the financial system and help ensure a level playing field. First issued in 1990, the FATF Recommendations were revised in 1996, 2001, 2003 and most recently in 2012 to ensure that they remain up to date and relevant, and they are intended to be of universal application.

The FATF monitors the progress of its members in implementing necessary measures, reviews money laundering and terrorist financing techniques and counter-measures, and promotes the adoption and implementation of appropriate measures globally. In collaboration with other international stakeholders, the FATF works to identify national-level vulnerabilities with the aim of protecting the international financial system from misuse.

In the guidance released on Jun. 21, 2019, the FATF updated its recommendation on mitigating the money laundering and terrorist financing risks associated with virtual asset activities. Cryptocurrency exchanges and other virtual asset businesses are struggling with the meaning and impact of this new guidance, which, once adopted by FATF member countries, will require them to pass customer information to each other when transferring crypto assets. This is similar to the standard that U.S. banks are required to abide by for wire transfers under the Bank Secrecy Act (BSA), which is often referred to as the "Travel Rule."

According to the FATF Interpretive Note to Recommendation 16, originator and beneficiary information should include the following:
Name and account number of the originator
Originator's (physical) address, or national identity number, or customer identification number, or date and place of birth
Name and account number of the beneficiary
Cross-border transfers below the USD/EUR 1,000 threshold should also include the names and account numbers of originator and beneficiary. However, this information does not need to be verified for accuracy unless there is a suspicion of money laundering or terrorist financing.

The FATF Travel Rule requires banks to share customer information in order to prevent money laundering. The organization also recommended that member states extend this rule to include virtual asset service providers (VASPs). Conforming to these regulations makes it necessary for VASPs to provide methods for secure transfer of information (e.g. related to virtual assets and identity of owners of such assets) between two VASPs, so that identity of beneficiary is confirmed beyond any doubts.

Various methods of obtaining secure data exchange are known, such as a method disclosed in WO2019016185A1 for communicating securely between electronic devices using symmetric key encryption, in which a first electronic device transfers to a second electronic device metadata with positional information which indicates the position of a first cryptographic key in a cryptographic key hierarchy. The second electronic device derives the first cryptographic key by way of a one-way function from a second cryptographic key stored in the second electronic device, using the positional information received from the first electronic device. Subsequently, the first electronic device and the second electronic device communicate data securely with symmetric key encryption using the first cryptographic key. This solution requires a trusted server (key authority). To the contrary, in the method according to the present invention any trusted $3^{rd}$ party/node is neither required nor needed.

Document U.S. Pat. No. 10,700,853 discloses a method of operation which includes receiving a request, from an entity, for one or more tokens based on one or more attributes, encrypting and masking the one or more attributes, adding the encrypted and masked one or more attributes to the one or more tokens, and transmitting the one or more tokens to the entity. The patent requires two trusted components: ECA, TCA and a central database. This is not the case in the present invention.

Document US20200184471A1 discloses a method for receiving a content of a confidential transaction of a client node, by a consensus node of a blockchain network, wherein the content of the confidential transaction includes one or more commitment values of the confidential transaction generated by the client node by applying a cryptographic commitment scheme to transaction data of the confidential transaction, and encrypted transaction information generated by encrypting the transaction data using a secret key of the client node, wherein a secret key is obtained by the client node according to a threshold secret sharing scheme with a plurality of client nodes, and one or more zero-knowledge proofs of the transaction data; verifying that the confidential transaction is valid based on the content of the confidential transaction; and storing the encrypted transaction information on a blockchain of the blockchain network. This solution related to a Blockchain technology—which is not the case with the present inventive method. Moreover, in this solution information exchanged between network nodes are verified and published by other network nodes, while in the present inventive method the information is neither verified nor published by other network nodes.

Document US20200204338A1 discloses a system and techniques for securing public key cryptographic systems and algorithms against cryptographic attacks such as attacks implemented on a quantum computer, via public key identifier rotation. The solution relates to creating and signing of transactions in Distributed Ledger Technology, DLT systems. The present invention does not relate to DLT systems. Innovative aspect of US20200204338A1 includes rotation of public key identifier, so as to prevent "breaking" the key with the use of quantum cryptography. Key identifiers are not used in the present inventive method and so there is no rotation thereof.

None of the methods known in the art can guarantee a secure information transfer between two VASPs fulfilling all the criteria below:

- No 3rd party can access data that is sent between two VASPs—either as plaintext or ciphertext.
- A VASP needs to cryptographically prove that it controls the address it is claiming.
- There is no trusted 3rd party. Network participants can decide or prove on their own if they want to proceed with data transfer.
- All data that needs to be shared by FATF regulations is be sent in a single package.
- System is transactional.
- In case malicious actor gets access to the system—such actors should have no impact to security of other VASP systems (especially cryptocurrency private keys).
- All cryptocurrency private keys supported by solutions can be used to generate proper ECDSA signature.

SUMMARY

It is thus the object of the present invention to provide a method for secure transferring of information through a network between an origin Virtual Asset Service Provider and a destination Virtual Asset Service Provider, in a hostile environment, where every entity (party member, network node) must proof its entitlement of the information being exchanged. Hostile environment means that neither any entity/network node nor the network as a whole can be trusted. The present method doesn't require other party member/network node or database to secure information transfer. Neither it requires any other trusted entity or server to guarantee or provide proof of ownership of exchange information. The present method for communicating securely between electronic devices uses asymmetric key encryption.

The authors of the present invention unexpectedly discovered a method for secure transferring of information through a hostile network (unsecured) with an unknown entity (party member) in a Peer-To-Peer network without any other storage entity (database, server, cloud), wherein information exchanged between two party members is accompanied with a proof of ownership of this information (=proof of entitlement to this information). The method for secure transferring of information is characterized in that the sending information entity can prove its identity and right to this information and the receiving entity can verify those information without any other information than those provided by the sender.

Beneficial effects of the invention consist in that every exchange of information is accompanied with a proof of entitlement to this information, which makes this exchange secure by validating it each time without trust or $3^{rd}$ party securing entity (e.g. trusted validating entity).

The provides a method for secure transferring of information through a network between an origin Virtual Asset Service Provider, origin VASP (originator VASP, SV) and a destination Virtual Asset Service Provider, destination VASP (VASP Z, RV), wherein:

the origin VASP (originator VASP, SV) is connected to said network and has an origin VASP network private key and an origin VASP network public key, the destination VASP (VASP Z, RV) is connected to said network and has a destination VASP network private key and a destination VASP network public key, said method comprising the following steps:

0a) Registering an asset owner, having an owner cryptocurrency private key and an owner cryptocurrency public key, with the destination VASP (VASP Z, RV), 0b) Creating an owner cryptocurrency address as a function of the owner cryptocurrency public key, preferably base58 hash160 with metadata and checksum, and depositing the owner cryptocurrency address in a database accessible to the destination VASP (VASP Z, RV), 0c) Creating a proof of ownership (POO) comprising as the first contents: the owner cryptocurrency address and the destination VASP network public key and comprising a first signature of said first contents generated as a function of the owner cryptocurrency private key, preferably as the Elliptic Curve Digital Signature Algorithm, ECDSA, function of: the first contents and the owner cryptocurrency private key, 0d) Storing the proof of ownership (POO) in a database accessible to the destination VASP (VASP Z, RV), 1a) Sending a cryptocurrency address lookup query by the origin VASP (originator VASP, SV) to one or more nodes or all nodes of the network, wherein the cryptocurrency lookup query comprises: a searched cryptocurrency address, a challenge string and the origin VASP network public key, 1b) Checking by the destination VASP (VASP Z, RV)—upon receiving the cryptocurrency lookup query—whether the searched cryptocurrency address matches the owner cryptocurrency address deposited in step 0b) and—in the affirmative—sending a response message (MSG 2) by the destination VASP (VASP Z, RV) to the origin VASP (originator VASP, SV), wherein the response message (MSG 2) comprises as the second contents: the proof of ownership (POO) corresponding to the owner cryptocurrency address and the challenge string and comprises a second signature of said second contents generated as a function of the destination VASP network private key, preferably as the ECDSA function of: the second contents and the destination VASP network private key, and comprises the destination VASP network public key, 2a) Checking by the origin VASP (originator VASP, SV)—upon receiving the response message MSG 2)—whether all the following conditions are true:

the owner cryptocurrency address contained in the proof of ownership (POO) matches the searched cryptocurrency address and the first signature contained in the proof of ownership (POO) matches the destination VASP network public key and the first contents, preferably by the ECDSA function of: the first contents, the destination VASP network private key and the first signature, and the challenge string contained in the response message (MSG 2) matches the challenge string contained in the cryptocurrency address lookup query and the network public key contained in the response message (MSG 2) matches the network public key of the destination VASP (VASP Z, RV) and the second signature contained in the response message matches the destination VASP network public key and the second contents preferably by the ECDSA function of: the second contents, the destination VASP network private key and the second signature;

and—in the affirmative—sending a third message (MSG 3) by the origin VASP (originator VASP, SV) to the destination VASP (VASP Z, RV), wherein the third message comprises a third contents and comprises a third signature of the third contents generated as a function of the origin VASP network private key, preferably as the ECDSA function of: the third contents and the origin VASP network private key, and optionally comprises the origin VASP network public key, 3a) Checking by the destination VASP (VASP Z, RV)— upon receiving the third message (MSG 3)—whether the third signature contained in the third message (MSG 3) matches the origin VASP network public key and the third contents, preferably by the ECDSA function of: the third contents, the origin VASP network private key and the third signature, and—in the affirmative—saving and/or executing the third contents.

Preferably, step 3a) includes generating an encrypting key as a function of the origin VASP network private key and the destination VASP network public key, preferably as an Elliptic-Curve Diffie-Hellman, ECDH, function of the origin VASP network private key and the destination VASP network public key, and encrypting the third contents with the encryption key by the origin VASP (originator VASP, SV) using a symmetric-key algorithm, as well as generating a decryption key as a function of the origin VASP network public key and the destination VASP network private key, preferably as an Elliptic-Curve Diffie-Hellman, ECDH, function of the origin VASP network public key and the destination VASP network private key, and decrypting the third contents with the decryption key by the destination VASP (VASP Z, RV) using a symmetric-key algorithm.

Preferably, the encryption and/or decryption is performed using the Advanced Encryption Standard 256, AES-256, algorithm.

Preferably, the method additionally comprises the step

4a) Sending a confirmation of saving and/or executing the third contents by the destination VASP (VASP Z, RV) to the origin VASP (originator VASP, SV).

Preferably, the third message (MSG 3) is transferred directly between the origin VASP (originator VASP, SV) and the destination VASP (VASP Z, RV).

Preferably, the challenge string in the step 1a) is a random string.

Preferably, said network is a peer-to-peer computer network, preferably with no central trusted authority and with no pre-existing trusted relationships between nodes of the computer network.

Preferably, wherein the asset owner is a physical person, a legal person, a network node or a Virtual Asset Service Provider, VASP.

The method may be implemented as a computer program product comprising program code stored on a non-transitory computer readable medium, said program code comprising computer instructions for performing the method according to the invention.

BRIEF DESCRIPTION OF THE DRAWINGS

Preferred embodiments of the present invention are presented in a more detailed way with reference to the attached drawings, in which.

DETAILED DESCRIPTION

Figure 1:
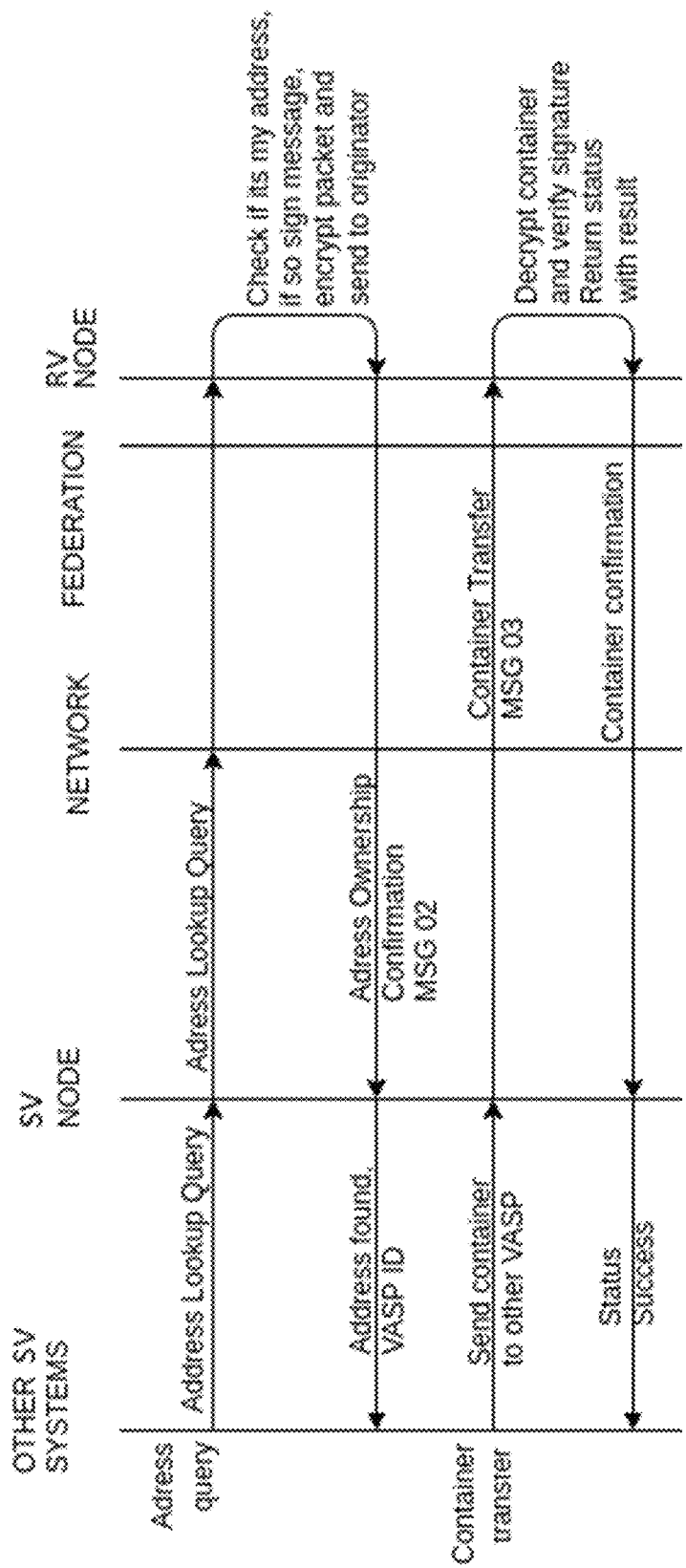
FIG. 1 shows the main process flow, consisting of two steps: address query, and container transfer.
Figure 2:
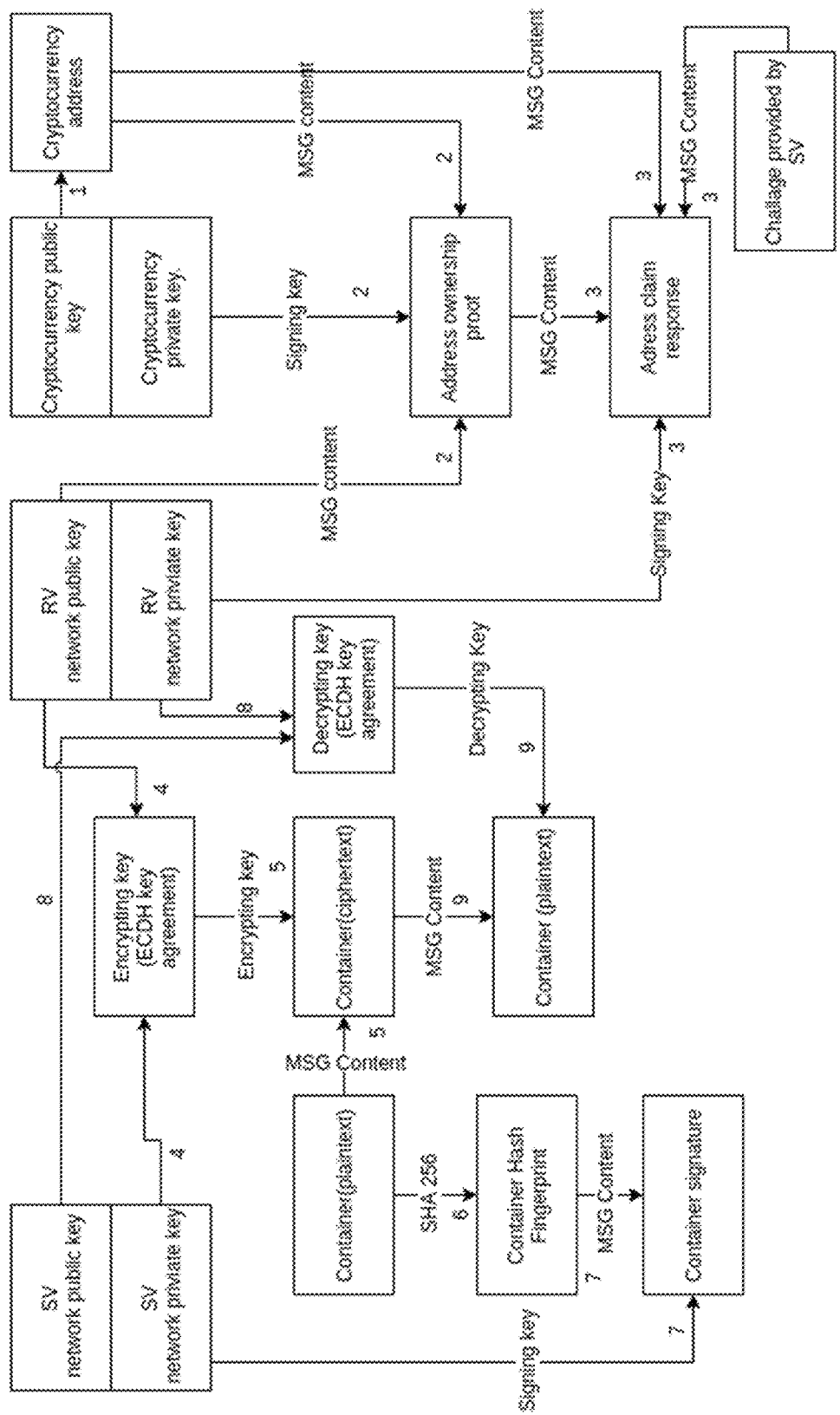
FIG. 2 shows a cryptography flow, in which consecutive operations have consecutive numbers.

Preferred embodiments of the invention are described in details below. The examples serve only as an illustration and do not limit the scope of the present invention.

When creating the present inventive method, the following assumptions were made:

No 3rd party can access data that is sent between two VASPs—either as plaintext or ciphertext.

A VASP needs to cryptographically prove that it controls the address it is claiming.

There is no trusted 3rd party. Network participants can decide or prove on their own if they want to proceed with data transfer.

All data that needs to be shared by FATF regulations is be sent in a single package.

System is transactional.

In case malicious actor gets access to the system—such actors should have no impact to security of other VASP systems (especially cryptocurrency private keys).

All cryptocurrency private keys supported by solutions can be used to generate proper ECDSA signature.

Terminology

Container—set of personal data required by FATF to transfer as well as additional metadata allowing proper data transfer (sender, recipient, signature, fingerprint etc.)

Fingerprint—SHA-256 hash out of container content

Container signature—signed message generated out of SHA-256 hash from container content signed by sending VASP (SV) private key.

Trudatum (TD)—Coinfirm solution that securely stores timestamped fingerprints of events on blockchain— disclosed e.g. in patent applications EP3579496A1, US2019379531A1 and WO2019233646A1.

Lookup query—request sent to Peer-To-Peer, P2P, network informing that the origin VASP (also called originator VASP or sending VASP, SV) wants to proceed with transaction and is looking for owner of a given address.

Container transfer—process of secure exchange of containerized personal data between two obliged entities (e.g. origin VASP and destination VASP).

Sending VASP (SV)—a VASP that sends funds, as well as data according to FATF regulations; also called origin VASP or originator VASP.

Receiving VASP (RV)—VASP that receives funds, and personal data according to FATF regulations; also called destination VASP.

Cryptocurrency keypair—keypair used to spend cryptocurrency (ex. bitcoin).

VASP keypair—Pair of public and private keys generated when joining network. Used to verify identity of VASP as well to securely exchange messages within network. Created using EC cryptography.

Signed message—Pair of: message contents and signature, generated by ECDSA using provided private key.

Challenge string—additional text attached to broadcasted message protecting against signature replay attack. Forcing responder to prove he is controlling VASP keypair at the time of responding to message.

Address Query

This action is the first stage after ordering the application to transfer a container.

The sending VASP (SV, Originator VASP) broadcasts a query containing cryptocurrency address to all network participants (VASP A, VASP B, . . . , VASP Z) looking for the address owner.

Network participants—upon receiving the query—look in their internal databases if given address is controlled by them. If so (VASP Z), it becomes the receiving VASP, RV. It is then signing message containing address, proof of ownership (POO) and challenge string using VASP private key and sends this response message (MSG 2) directly to the SV. The SV verifies if signature is valid and proceeds to next stage.

Container Transfer

After the first stage the SV knows who has ownership of given address (so: who the receiving VASP is), which allows to set up a direct connection to the RV. Container is then built in application, hashed, encrypted, signed and transferred to the RV. When the RV receives the container, it proceeds to decryption (using its private/decrypting key), verifies signature, and validates the hash. If data match—the RV sends a confirmation to the SV. The RV may then execute and/or store the message received (or otherwise according to the message received). Optionally, as a continuation of the process, the SV after receiving confirmation—may proceed to register a corresponding information in a system as disclosed in the patent applications EP3579496A1, US2019379531A1 and WO2019233646A1 (Trudatum). This creates cryptographic proof that container was created and sent, at a given moment—and not much later and backdated. Delegated keys are created by storing message with the RV public key signed by cryptocurrency private key thus creating chain of trust, similarly to GPG's trusted keys.

Example 1

Exchanging of information through a network between an origin Virtual Asset Service Provider, origin VASP (originator VASP, RV) and a destination Virtual Asset Service Provider, destination VASP (VASP Z, RV), wherein the origin VASP (originator VASP, RV) is connected to said network and has an origin VASP network private key and an origin VASP network public key. The destination VASP (VASP Z, RV) is connected to said network (FIG. 1) and has a destination VASP network private key and a destination VASP network public key. Before start of exchanging information an asset owner is registered, having an owner cryptocurrency private key and an owner cryptocurrency public key, with the destination VASP (VASP Z, RV). Next step is creating an owner cryptocurrency address as a function of the owner cryptocurrency public key and depositing the owner cryptocurrency address in a database accessible to the destination VASP (VASP Z, RV). Suitable functions are selected depending on the type of cryptocurrency. For example for bitcoin the address is the version designation+ hash160 (owner cryptocurrency public key)+checksum encoded as base58. However, more address forms are possible according to https://en.bitcoin.it/w/images/en/4/48/Address map.jpg. This is followed by creating a proof of ownership (POO) comprising as the first contents: the owner cryptocurrency address and the destination VASP network public key and comprising a first signature of said first contents generated as a function of the owner cryptocurrency private key, preferably as the Elliptic Curve Digital Signature Algorithm, ECDSA, function of: the first contents and the owner cryptocurrency private key. As a less favorable alternative, the ECDSA function of: a hash of the first contents and the owner cryptocurrency private key may be used. Finally there is a step of storing the proof of ownership (POO) in a database accessible to the destination VASP (VASP Z, RV).

Figure 3:
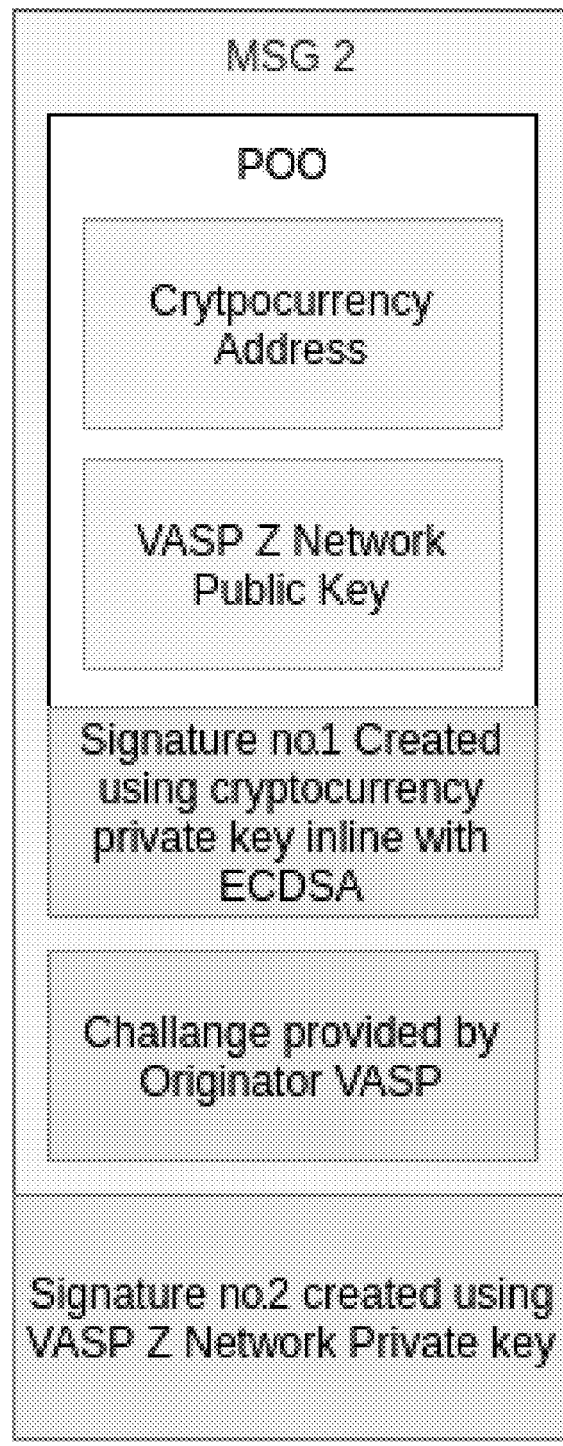
FIG. 3 presents schematic structure of the proof of ownership POO and the response message MSG 2.
Figure 4:
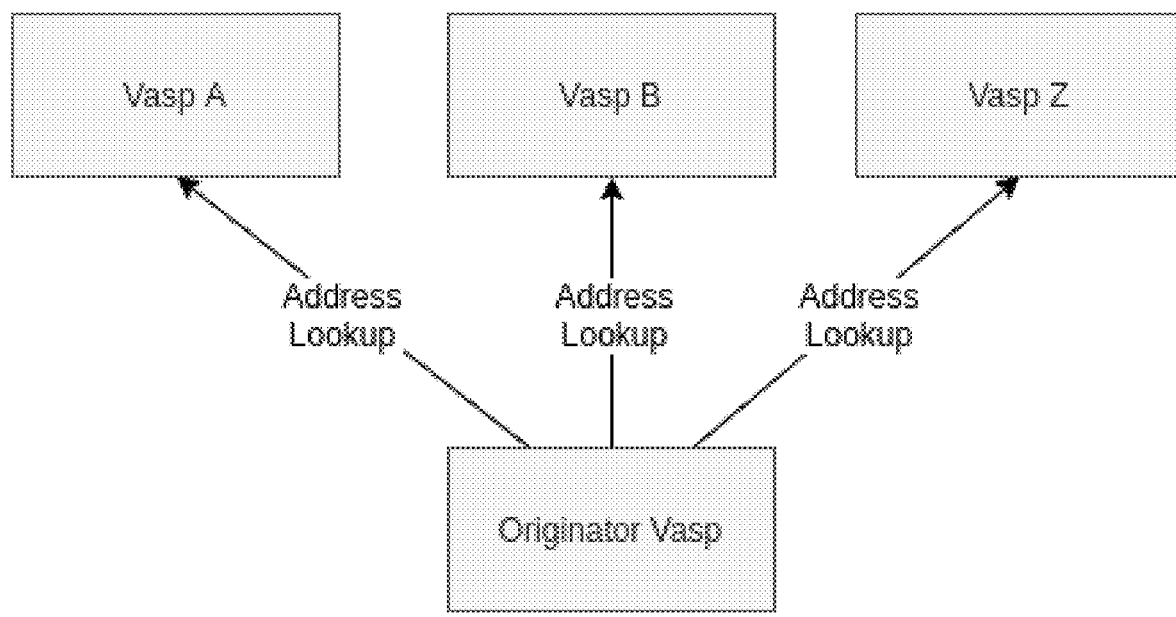
FIG. 4 presents a schematic execution of step 1a), in which origin VASP sends address lookup query to all network participants.
Figure 5:
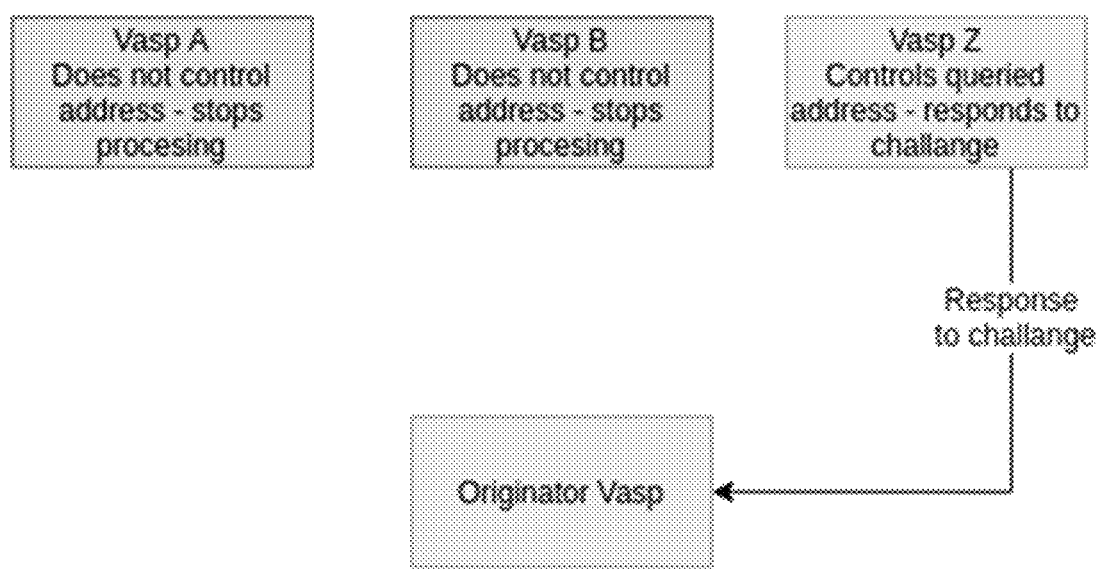
FIG. 5 presents a schematic execution of step 1b), in which all communication is directly between origin VASP (VASP A) and destination VASP (VASP Z).

The exchange process starts with sending (or: broadcasting) a cryptocurrency address lookup query (FIG. 4) by the origin VASP (originator VASP, RV) to one or more nodes or all nodes of the network, wherein the cryptocurrency lookup query comprises: a searched cryptocurrency address, a challenge string and the origin VASP network public key. The next step is checking by the destination VASP (VASP Z, RV)—upon receiving the cryptocurrency lookup query (FIG. 5)—whether the searched cryptocurrency address matches the owner cryptocurrency address. In the affirmative—sending a response message (MSG 2) (FIG. 3) by the destination VASP (VASP Z, RV) to the origin VASP (originator VASP, RV). The response message (MSG 2) comprises as the second contents: the proof of ownership (POO, matching the owner cryptocurrency address and thus the searched cryptocurrency address) and the challenge string and comprises a second signature of said second contents generated as a function of the destination VASP network private key, preferably as the ECDSA function of: the second contents and the destination VASP network private key, and comprises the destination VASP network public key. Followed by checking by the origin VASP (originator VASP, RV)—upon receiving the response message (MSG 2)—whether all the following conditions are true:

the owner cryptocurrency address contained in the proof of ownership (POO) matches the searched cryptocurrency address and the first signature contained in the proof of ownership (POO) matches the destination VASP network public key and the first contents and the challenge string contained in the response message (MSG 2) matches the challenge string contained in the cryptocurrency address lookup query and the network public key, sent along with the response message (MSG 2), matches the network public key of the destination VASP (VASP Z, RV) and the second signature contained in the response message matches the destination VASP network public key and the second contents preferably by the ECDSA function of: the second contents, the destination VASP network private key and the second signature;

In the affirmative of above mentions conditions—the origin VASP (originator VASP, RV) proceeds with sending a third message (MSG 3) to the destination VASP (VASP Z, RV). The third message comprises a third contents and comprises a third signature of the third contents generated as a function of the origin VASP network private key, preferably as the ECDSA function of: the third contents and the origin VASP network private key, and comprises the origin VASP network public key.

The subsequent step consists in checking by the destination VASP (VASP Z, RV)—upon receiving the third message (MSG 3)—whether the third signature contained in the third message (MSG 3) matches the origin VASP network public key and the third contents, preferably by the ECDSA function of: the third contents, the origin VASP network private key and the third signature, and—in the affirmative—saving and/or executing the third contents.

In another example advantageously step 3a) includes generating an encrypting key as a function of the origin VASP network private key and the destination VASP network public key (preferably as an Elliptic-Curve Diffie-Hellman, ECDH, function of the origin VASP network private key and the destination VASP network public key, https://en.wikipedia.org/wiki/Elliptic-curve Diffie%E2%80%93Hellman) and encrypting the third contents with the encryption key by the origin VASP (originator VASP, SV). Also includes generating a decryption key as a function of the origin VASP network public key and the destination VASP network private key (preferably as an Elliptic-Curve Diffie-Hellman, ECDH, function of the origin VASP network public key and the destination VASP network private key) and decrypting the third contents with the decryption key by the destination VASP (VASP Z, RV). For said encryption and/or decryption of the third contents any known symmetric-key algorithm can be used and preferably Advanced Encryption Standard 256, AES-256, algorithm is used (https://en.wikipedia.org/wiki/Advanced Encryption Standard).

In another example advantageously the encryption and/or decryption is performed using the Advanced Encryption Standard 256, AES-256, algorithm.

Another embodiment advantageously additionally comprises the step 4a) Sending a confirmation of saving and/or executing the third contents by the destination VASP (VASP Z, RV) to the origin VASP (originator VASP, SV).

In another example advantageously the third message (MSG 3) is transferred directly, meaning without any 3rd party/3rd network node in the process, between the origin VASP (originator VASP, SV) and the destination VASP (VASP Z, RV).

In another example advantageously the challenge string in the step 1a) is a random string.

In another example advantageously said network is a peer-to-peer computer network, preferably with no central trusted authority and with no pre-existing trusted relationships between nodes of the computer network.

Advantageously the asset owner is a physical person, a legal person, a network node or a Virtual Asset Service Provider, VASP.

Invention advantageously have form of a computer program product comprising program code stored on a computer readable medium, said program code comprising computer instructions for performing the above mention method.

Invention advantageously is a system configured and programmed for performing the method according to any one of the above mention method.

The present invention also relates to a computer program product comprising program code stored on a non-transitory computer readable medium, said program code comprising computer instructions for performing the aforementioned method.

The present invention is applicable in any network environment such as P2P (Peer-To-Peer), torrent etc. including systems described in patent applications EP3579496A1, US2019379531A1 and WO2019233646A1.

The invention claimed is:

1. A method for secure transferring of information through a network between an origin VASP (origin Virtual Asset Service Provider) and a destination VASP (destination Virtual Asset Service Provider), wherein:
   the origin VASP (origin Virtual Asset Service Provider) is connected to said network and has an origin VASP (origin Virtual Asset Service Provider) network private key and an origin VASP (origin Virtual Asset Service Provider) network public key,
   the destination VASP (destination Virtual Asset Service Provider) is connected to said network and has a destination VASP (destination Virtual Asset Service Provider) network private key and a destination VASP (destination Virtual Asset Service Provider) network public key,
   said method comprising the following steps:
   0a) registering an asset owner, having an owner cryptocurrency private key and an owner cryptocurrency public key, with the destination VASP (destination Virtual Asset Service Provider),
   0b) creating an owner cryptocurrency address as a function of the owner cryptocurrency public key, base58 hash160 with metadata and checksum, and depositing the owner cryptocurrency address in a database accessible to the destination VASP (destination Virtual Asset Service Provider),
   0c) creating a proof of ownership (POO) comprising as first contents: the owner cryptocurrency address and the destination VASP (destination Virtual Asset Service Provider) network public key and comprising a first signature of said first contents generated as a function of the owner cryptocurrency private key,
   0d) storing the proof of ownership (POO) in a database accessible to the destination VASP (destination Virtual Asset Service Provider),
   1a) sending a cryptocurrency address lookup query by the origin VASP (origin Virtual Asset Service Provider) to one or more nodes or all nodes of the network, wherein the cryptocurrency lookup query comprises: a searched cryptocurrency address, a challenge string and the origin VASP (origin Virtual Asset Service Provider) network public key,
   1b) checking by the destination VASP (destination Virtual Asset Service Provider)—upon receiving the cryptocurrency lookup query—whether the searched cryptocurrency address matches the owner cryptocurrency address deposited in step 0b) and—in the affirmative—sending a response message (MSG 2) by the destination VASP (destination Virtual Asset Service Provider) to the origin VASP (origin Virtual Asset Service Provider), wherein the response message (MSG 2) comprises as second contents: the proof of ownership (POO) corresponding to the owner cryptocurrency address and the challenge string and comprises a second signature of said second contents generated as a function of the destination VASP (destination Virtual Asset Service Provider) network private key, and comprises the destination VASP (destination Virtual Asset Service Provider) network public key,
   2a) checking by the origin VASP (origin Virtual Asset Service Provider)—upon receiving the response message (MSG 2)—whether all the following conditions are true:
     the owner cryptocurrency address contained in the proof of ownership (POO) matches the searched cryptocurrency address and
     the first signature contained in the proof of ownership (POO) matches the destination VASP (destination Virtual Asset Service Provider) network public key and the first contents, by an ECDSA (Elliptic Curve Digital Signature Algorithm) function of: the first contents, the destination VASP (destination Virtual Asset Service Provider) network private key and the first signature, and the challenge string contained in the response message (MSG 2) matches the challenge string contained in the cryptocurrency address lookup query and the network public key contained in the response message (MSG 2) matches the network public key of the destination VASP (destination Virtual Asset Service Provider) and the second signature contained in the response message matches the destination VASP (destination Virtual Asset Service Provider) network public key and the second contents;

and—in the affirmative—sending a third message (MSG 3) by the origin VASP (origin Virtual Asset Service Provider) to the destination VASP (destination Virtual Asset Service Provider), wherein the third message comprises a third contents and comprises a third signature of the third contents generated as a function of the origin VASP (origin Virtual Asset Service Provider) network private key, 3a) checking by the destination VASP (destination Virtual Asset Service Provider) upon receiving the third message (MSG 3)—whether the third signature contained in the third message (MSG 3) matches the origin VASP (origin Virtual Asset Service Provider) network public key and the third contents, by the ECDSA (Elliptic Curve Digital Signature Algorithm) function of: the third contents, the origin VASP (origin Virtual Asset Service Provider) network private key and the third signature, and—in the affirmative—saving or executing the third contents.

2. The method according to claim 1, wherein step 3a) includes generating an encrypting key as a function of the origin VASP (origin Virtual Asset Service Provider) network private key and the destination VASP (destination Virtual Asset Service Provider) network public key, and encrypting the third contents with the encryption key by the origin VASP (origin Virtual Asset Service Provider) using a symmetric-key algorithm, as well as generating a decryption key as a function of the origin VASP (origin Virtual Asset Service Provider) network public key and the destination VASP (destination Virtual Asset Service Provider) network private key, as an Elliptic-Curve Diffie-Hellman, ECDH, function of the origin VASP (origin Virtual Asset Service Provider) network public key and the destination VASP (destination Virtual Asset Service Provider) network private key, and decrypting the third contents with the decryption key by the destination VASP (destination Virtual Asset Service Provider) using a symmetric-key algorithm.

3. The method according to claim 2, wherein the encryption or decryption is performed using the Advanced Encryption Standard 256, AES-256, algorithm.

4. The method according to claim 1, which additionally comprises the step

4a) Sending a confirmation of saving or executing the third contents by the destination VASP (destination Virtual Asset Service Provider) to the origin VASP (origin Virtual Asset Service Provider).

5. The method according to claim 1, wherein the third message (MSG 3) is transferred directly between the origin VASP (origin Virtual Asset Service Provider) and the destination VASP (destination Virtual Asset Service Provider).

6. The method according to claim 1, wherein the challenge string in the step 1a) is a random string.

7. The method according to claim 1, wherein said network is a peer-to-peer computer network.

8. The method according to claim 1, wherein the asset owner is a physical person, a legal person, a network node or a Virtual Asset Service Provider, VASP.

9. A computer program product comprising program code stored on a non-transitory computer readable medium, said program code comprising computer instructions for performing the method according to claim 1.

10. The method according to claim 1, wherein the step of creating the proof of ownership (POO) further comprises the first signature of said first contents generated as the function of the owner cryptocurrency private key as the ECDSA (Elliptic Curve Digital Signature Algorithm) function of: the first contents and the owner cryptocurrency private key.

11. The method according to claim 10, wherein the step of checking by the destination VASP (destination Virtual Asset Service Provider) further comprises the ECDSA (Elliptic Curve Digital Signature Algorithm) function of: the second contents and the destination VASP (destination Virtual Asset Service Provider) network private key.

12. The method according to claim 10, wherein the step of checking by the origin VASP (origin Virtual Asset Service Provider)—upon receiving the response message (MSG 2) further comprises the ECDSA (Elliptic Curve Digital Signature Algorithm) function of: the second contents, the destination VASP (destination Virtual Asset Service Provider) network private key and the second signature.

13. The method according to claim 10, wherein the step of sending the third message (MSG 3) by the origin VASP (origin Virtual Asset Service Provider) to the destination VASP (destination Virtual Asset Service Provider) further comprises the ECDSA (Elliptic Curve Digital Signature Algorithm) function of: the third contents and the origin VASP (origin Virtual Asset Service Provider) network private key, and comprises the origin VASP (origin Virtual Asset Service Provider) network public key.

14. The method according to claim 2, wherein generating said encrypting key as the function of the origin VASP (origin Virtual Asset Service Provider) network private key and the destination VASP (destination Virtual Asset Service Provider) network public key comprises an Elliptic-Curve Diffie-Hellman (ECDH) function of the origin VASP (origin Virtual Asset Service Provider) network private key and the destination VASP (destination Virtual Asset Service Provider) network public key.

15. The method according to claim 7, wherein said network is the peer-to-peer computer network with no central trusted authority and with no pre-existing trusted relationships between nodes of the computer network.

* * * * *